United States Patent [19]
Slemmons

[11] 3,844,002
[45] Oct. 29, 1974

[54] GRIPPER ASSEMBLY FOR JACKING MECHANISMS

[75] Inventor: Charles O. Slemmons, Akron, Ohio

[73] Assignee: The General Tire & Rubber Company, Akron, Ohio

[22] Filed: Mar. 16, 1973

[21] Appl. No.: 342,248

[52] U.S. Cl. .............................. 24/263 DH, 61/46.5
[51] Int. Cl. ........................... E04b 1/56, F16b 9/02
[58] Field of Search.... 24/263 D, 263 DA, 263 DH, 24/263 DG; 251/1, 5; 61/46.5

[56] References Cited
UNITED STATES PATENTS

| | | |
|---|---|---|
| 2,073,890 | 3/1937 | Tschappat..................... 24/263 D X |
| 2,843,349 | 7/1958 | Meyer..................................... 251/1 |
| 2,934,804 | 5/1960 | Suderow ........................ 24/263 DH |
| 2,945,665 | 7/1960 | Regan et al......................... 251/5 X |
| 3,253,854 | 5/1966 | Hollander .................... 24/263 DH X |
| 3,422,505 | 1/1969 | Slemmons..................... 24/263 DH |
| 3,481,610 | 12/1969 | Slator et al. ...................... 251/5 X |

FOREIGN PATENTS OR APPLICATIONS

| | | |
|---|---|---|
| 642,875 | 5/1964 | Belgium................................ 251/5 |

Primary Examiner—Donald A. Griffin
Attorney, Agent, or Firm—Cushman, Darby & Cushman

[57] ABSTRACT

A pneumatic gripping assembly, for use in a jacking mechanism releasably engageable with a cylindrical supporting column, consists of an inflatable toroidal tube of rubber-like material disposable in the bottom of an inwardly facing annular channel of the jacking mechanism, and a toroidal slug assembly of rubber-like material disposable in the channel inwardly of the tube. The slug is constrictable into frictional engagement with a cylindrical column by inflation of the tube. The assembly is made up of a plurality of arcuate segments of greater radial dimension than the wall of the tube. When assembled, with the segments in end-to-end abutting engagement with no gaps therebetween, the assembly has a cylindrical inner surface of a diameter substantially equal to the inner diameter of the rim of the channel.

10 Claims, 9 Drawing Figures

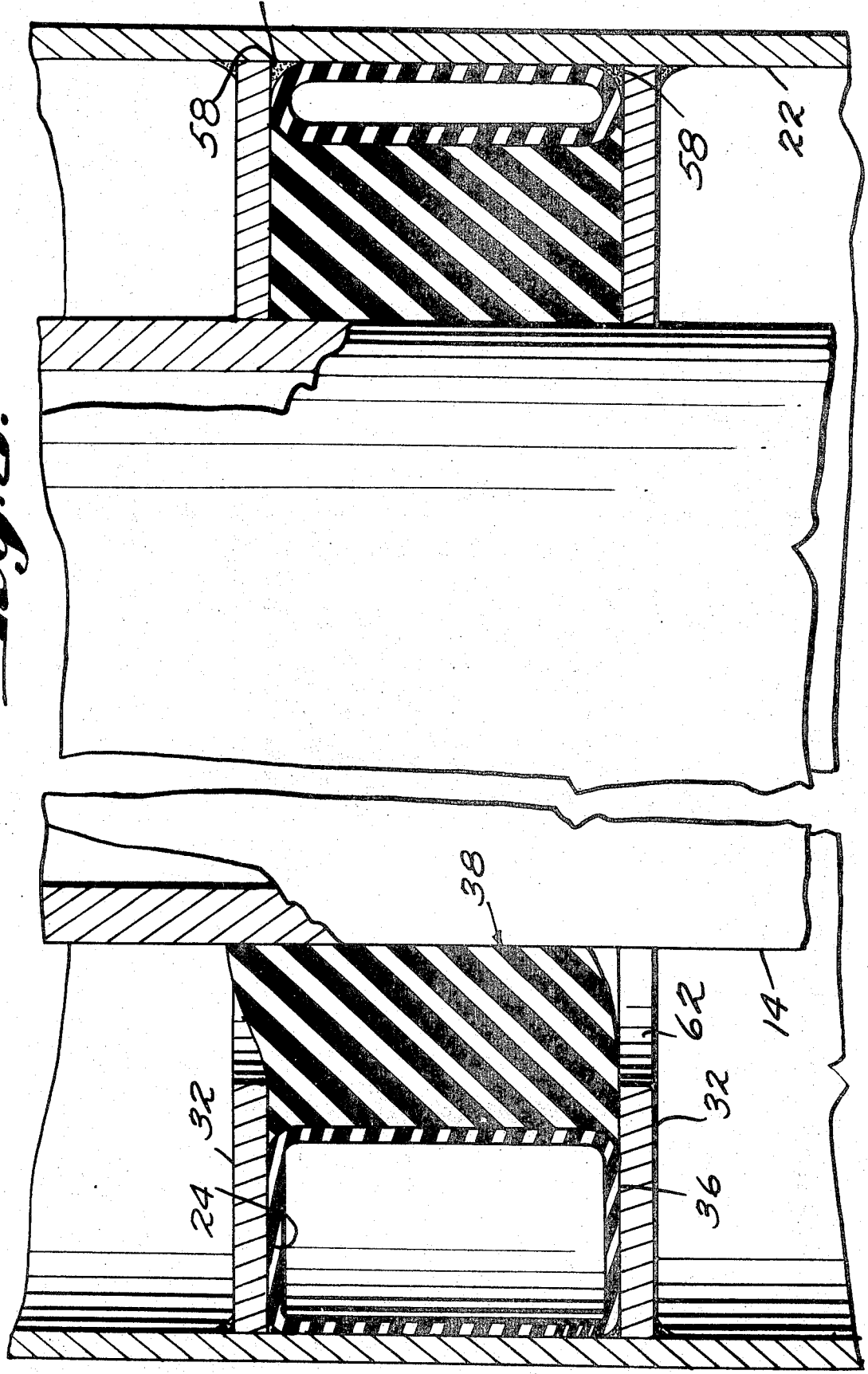

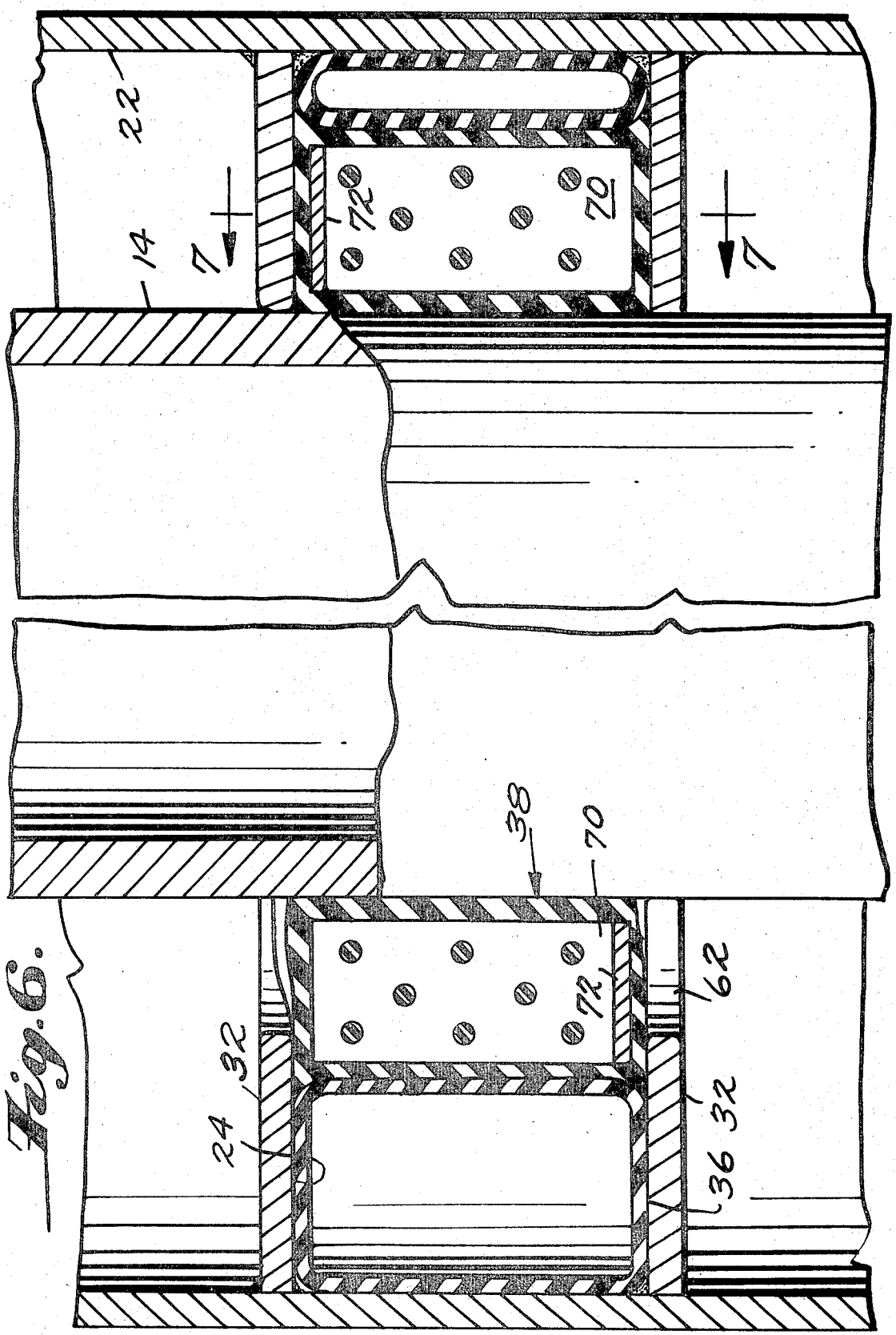

GRIPPER ASSEMBLY FOR JACKING MECHANISMS

FIELD OF THE INVENTION

This invention relates to an improved pneumatic gripping assembly for use in jacking mechanisms of the type disclosed in the patent to Pointer, U.S. Pat. No. 2,775,869, issued Jan. 1, 1957, for raising, lowering and supporting large platform-like structures on cylindrical supporting columns or caissons. More especially, this invention pertains to improvements in pneumatic gripping assemblies of this type disclosed in the patent to Slemmons, U.S. Pat. No. 3,422,505, issued Jan. 21, 1969.

BACKGROUND OF THE INVENTION

The above-mentioned Pointer patent discloses a jacking mechanism for lifting or lowering large platformlike structures on smooth-surfaced cylindrical supporting legs or columns, commonly hollow steel columns termed caissons. Engagement of the jacking mechanism with the caisson is afforded by a friction grip accomplished by inflation of one or more toroidal tubes of elastic material, e.g., rubber, each of which encircles the column and is disposed in an inwardly facing annular channel of iron or steel forming a structural part of the jacking mechanism. In actual practice such tubes or inflatable grippers initially were made in one piece and provided with a thick inner wall, but later, as disclosed in the Slemmons patent and for the reasons there ascribed, such grippers were made in two parts, an outer relatively thin-walled inflatable tube and an inner solid toroid, commonly called a slug, which is generally rectangular in radial section and relatively thick in radial dimension.

While two-piece grippers of the type disclosed by Slemmons attain many of the advantages there described, such grippers still possess some drawbacks and are susceptible of improvements. In particular, the slug in practice is made of relatively hard abrasion-resistant rubber which is somewhat brittle. Consequently, some difficulty is had in assembling slugs in their channels without breakage. In fact, breakage sometimes does occur. Such slugs also tend to become more brittle with age and flexing in use, so that removal from a channel without breakage is almost impossible. Moreover, the supporting columns or caissons for the platform-like structure have, in actual practice, been of the order of 6 feet in diameter, necessitating the use of a slug having an inner diameter slightly larger than 6 feet. Not only is a mold for making a slug of this size quite expensive, but also shipping and handling costs of such slugs are high.

At the present time the raising of extremely large heavy structures by such jacking mechanisms is being contemplated. In fact, plans are under way for erecting generally square platforms, of the order of 250 feet × 250 feet in water depths of 500 to 600 feet. The size of the supporting caissons must be increased correspondingly, e.g. to the order of 16 to 20 feet in diameter. The manufacture of a one-piece slug of a size to embrace such a large caisson would be prohibitive because of mold cost and other manufacturing difficulties. Moreover, shipping, handling and installation of a one-piece slug of that size without breakage would be almost impossible let alone other practical difficulties involved.

Other complications also arise. Due to practical tolerances allowed in manufacturing a 6 foot diameter caisson, a close sliding fit between such a caisson and the inner rims of the annular channels of the jacking mechanism cannot be attained in actual practice. Instead, to allow for diameter variations due to manufacturing tolerances of a 6 foot caisson the diameter of the channel rims is 6 feet ¾ inches. This allows the slug, when constricted into gripping engagement, to protrude three-eighths inch from its channel uniformly therearound when the caisson is actually 6 feet in diameter and centered in the jacking mechanism. If completely off center, however, an event which occurs frequently in practice, the slug may protrude three-fourths inch on one side. When the gripper is under a large load, e.g., when the jacking mechanism is lifting a heavy structure, such a degree of protrusion gives rise to a possibility of the slug partly rolling out of its channel or bulging at one side into the three-fourths inch gap between the channel rim and the caisson sufficiently to jam therein. Such rollout or jamming may well prevent relative longitudinal movement between the corresponding section of the jacking mechanism and the caisson when the gripper assembly is released by deflating its tube. This result could prove disastrous. In any event, even if jamming does not occur, on rollout of the slug a blow out of the tube is more than likely.

Further, a slug protrusion of three-fourths inch on one side gives rise to some vertical deflection of the slug in the gap when the gripper is under heavy load. This deflection of a portion of the slug at one side transfers most of the load to the opposite side. Such uneven distribution of the load about the circumference of the gripper could easily result in slippage of the gripper on the caisson, again with possible disastrous consequences.

These possible difficulties are magnified when caisson diameter is increased. For example, to allow for diameter variations due to manufacturing tolerances on a caisson 16 feet in diameter, the inner diameter of the rim of a gripper channel would be 16 feet 3 inches. This will cause a 3 inch gap at one side between a channel rim and the caisson when the latter is off-center to the maximum extent. Such a 3 inch gap increases the possibility of slug rollout, blowout, jamming, and slippage.

Additionally, it has been found that with the caisson off-center, that portion of the slug engaged by the caisson sometimes can be pushed back into its channel far enough to compress the inflatable tube therebehind sufficiently to block egress of air from the spud if the pushed back portion of the slug happens to be opposite the spud. Such an occurrence would prevent release of the gripper, a most undesirable event to say the least.

In other instances, particularly with a one-piece slug, the latter can become off-center during assembly with consequent protrusion at the side beyond the rims of its channel. This gives rise to a danger of interference with a caisson, when the latter is being threaded into the jacking mechanism, with consequent damage to the slug.

Accordingly, it is an object of this invention to provide an improved pneumatic gripping assembly which is less expensive to manufacture, ship and handle.

It is another object of this invention to provide an improved pneumatic gripping assembly which is less subject to breakage during handling and which can be installed and removed easily and with little possibility of breakage.

It is another object of this invention to provide an improved pneumatic gripping assembly which reduces the possibility of blowout, rollout, jamming, and slippage.

It is another object of this invention to provide an improved pneumatic gripping assembly especially adapted for large sizes.

It is still another object of this invention to provide an improved pneumatic gripping assembly wherein there is no possibility of its release being prevented by blockage of a spud due to a caisson being off-center.

It is a further object of this invention to provide an improved pneumatic gripping assembly which will eliminate the possibility of interference with a caisson during assembly.

Other objects and advantages of the invention will become evident from the following description and accompanying drawings in which:

BRIEF DESCRIPTION OF THE DRAWINGS

FIG. 5 is an enlarged view corresponding to FIG. 2, but somewhat simplified by omission of parts, showing the gripping assembly operatively engaged with the caisson and the latter off-center to its maximum extent.

FIG. 6 is a view corresponding to FIG. 5 showing a modified form of the invention.

DETAILED DESCRIPTION OF THE INVENTION

Figure 1:
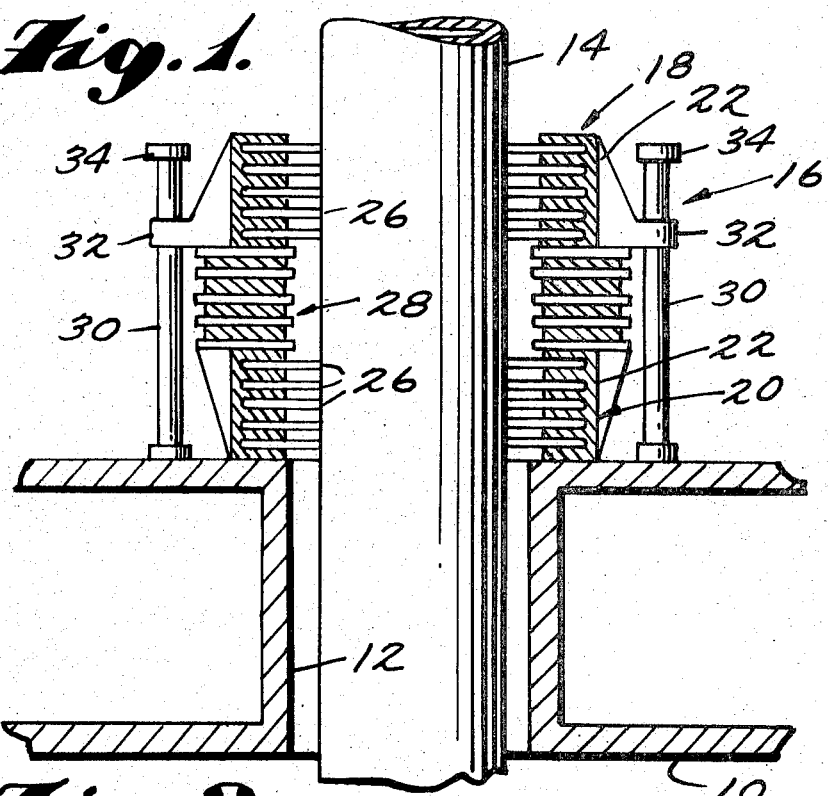
FIG. 1 is a schematic fragmentary vertical sectional view of a jacking mechanism, utilizing pneumatic gripping assemblies embodying this invention, operatively related to platform-like structure and a supporting caisson.
Figure 2:
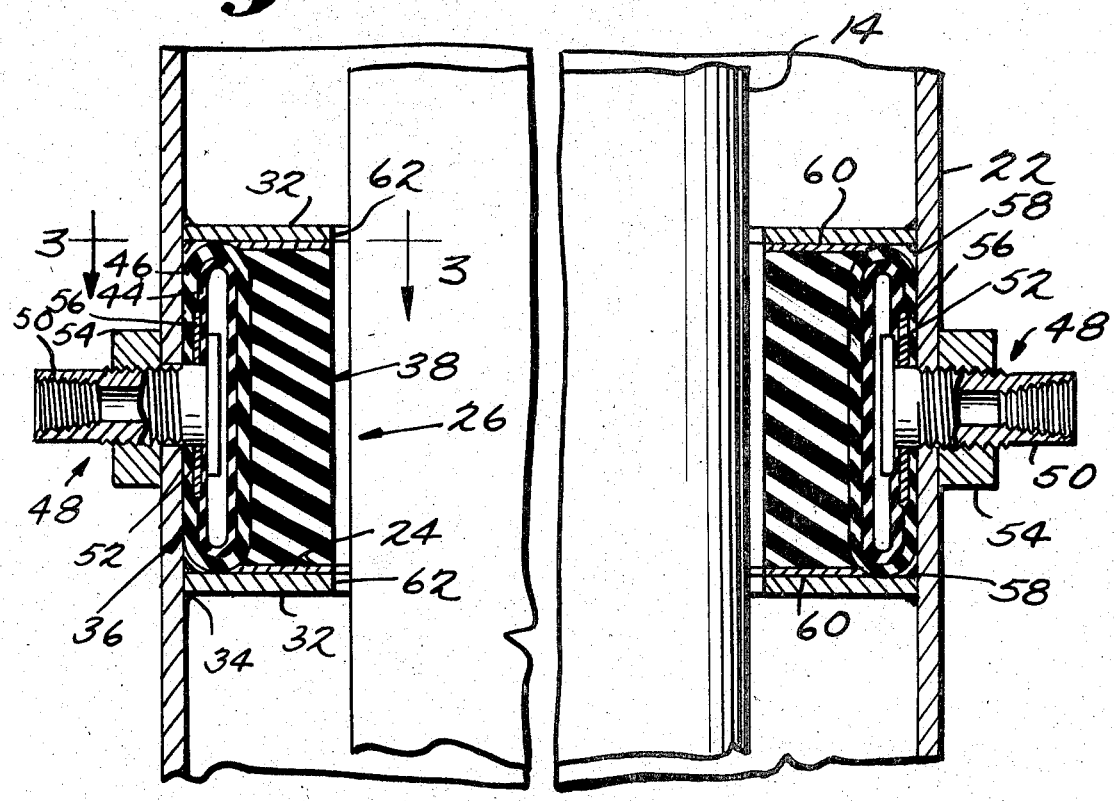
FIG. 2 is an enlarged fragmentary sectional view of a portion of the caisson and jacking mechanism shown in FIG. 1 showing one of the pneumatic gripper assemblies of the mechanism in its released or relaxed condition.

Referring now to FIGS. 1 and 2 of the drawings, there is shown a large platform-like structure 10 having a vertical guide well 12 through which extends an upright cylindrical supporting column or caisson 14. Operatively associated with the caisson 14 and connected to the structure 10 is a jacking mechanism 16 having upper and lower gripper sections 18 and 20. Each gripper section comprises a rigid annular collar or sleeve-like structure 22 which surrounds the caisson 14 and is provided with a plurality of inwardly facing circumferential channels 24 (FIG. 2). Disposed in each channel 24 is a pneumatic gripping assembly 26 embodying this invention for selectively gripping or releasing the caisson 14. Between the upper and lower sections 18 and 20 is an annular section 28, either pneumatic or hydraulic but here shown as pneumatic, selectively capable of exerting a powerful force to push the sections 18 and 20 apart or a lesser force to pull them together.

Abutment means are provided on the platform 10 to limit, respectively, downward movement of the lower section 20 and upward movement of the upper section 18 relative to the platform 10. In the embodiment shown, the lower section 20 can abut the top of the platform 10 while the upper section 18 is connected to the platform by a plurality of circumferentially arranged tie rods 30 slidably extending through ears 32 on the upper section 22. The lower ends of the rods 30 are secured to the platform 10 while their upper ends are provided with heads 34 engageable by the ears 32 to limit upward movement of the upper section 18 relative to the platform.

As described in detail in both of the above-mentioned patents, the jacking mechanism 16 can be operated selectively to effect step-by-step relative movement in either direction between the platform 10 and the caisson 14 longitudinally of the latter, or to simply restrain such movement. Hence, no further description of such operation is necessary here.

Figure 3:
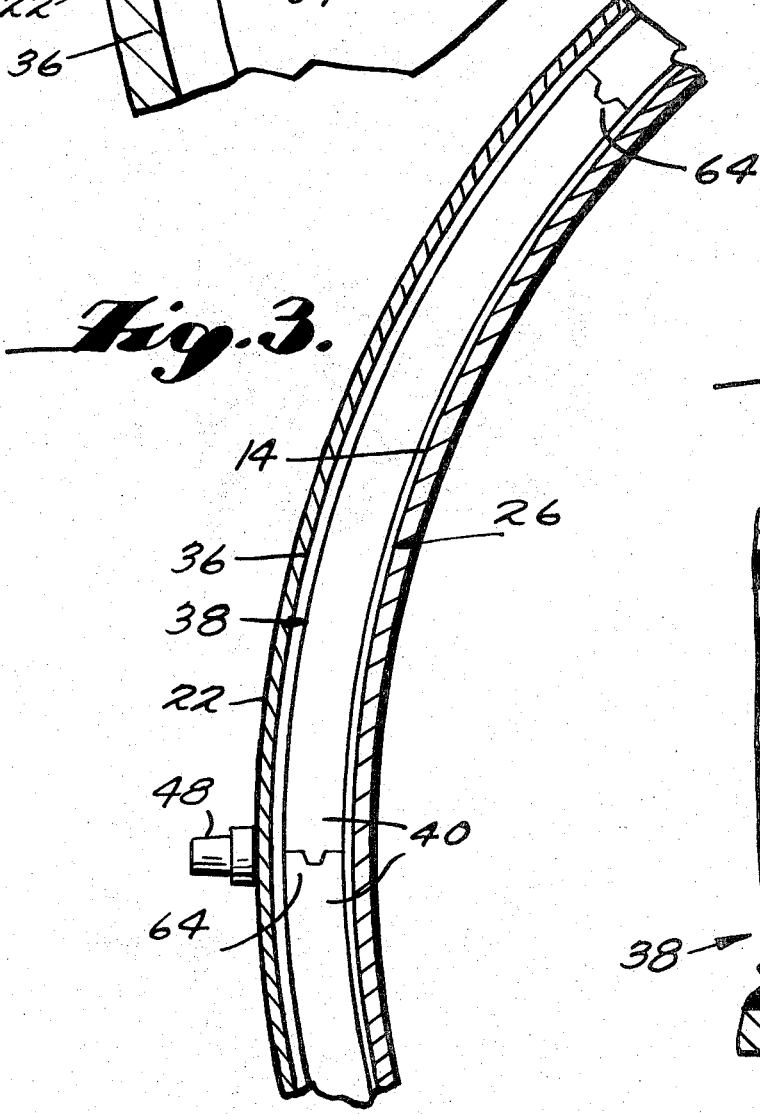
FIG. 3 is a somewhat reduced fragmentary sectional view taken generally on line 3—3 of FIG. 2.

Referring now to FIG. 2, there is shown one of the inwardly facing circumferential channels 24 in one of the jack sections. The channel 24 is formed by a cylindrical sleeve-like member 22 and two axially-spaced flat annular rings 32 welded to the inner side of the member 22. The inner diameter of the rings 32 is somewhat less than the outer diameter of the caisson 14 for reasons explained above. Disposed in the channel 24 is a toroidal pneumatic gripper assembly 26 which includes an endless inflatable tube 36 in the bottom of the channel surrounding a separate inner annular slug assembly 38 made up of a plurality of solid arcuate segments 40 as shown in FIG. 3. The tube 36, made of relatively thin-walled quite resilient rubber or the like, has, when deflated, convexly rounded top and bottom portions joined by generally cylindrical inner and outer walls. The tube 36 preferably is of uniform wall thickness and constructed of concentric inner and outer parts 44 and 46 bonded to each other during manufacture as shown in FIG. 2. The inner part 44 is a tubular air container made of rubber, while the outer part 46 comprises a sheet of rubber wrapped around the inner part and bonded thereto by heat and pressure in a mold. A pair of diametrically disposed spuds 48 are provided for admitting and exhausting air to and from the tube 36. Each spud 48 includes a short tubular member 50 having a radial flange 52 on its inner end overlying the marginal edge portions of an opening in the outer wall of the tube 36 through which the member 50 extends and exteriorly through an aligned opening in the sleeve 22 of the jack section. The outer end of the member 50 is threaded for reception of a nut 54 to clamp the marginal edge portions of the tube opening between the flange 52 and the sleeve 22. A line (not shown) for supplying and exhausting air under pressure to and from the tube 36 may be appropriately connected to the outer end of the member 50 as by engagement with interior threads in such outer end. Preferably, the marginal edge portions of the opening in the tube 36 are reinforced by a woven fabric sheet 56 embedded in the tube between its inner and outer parts 44 and 46. Two preferably diametrically-disposed spuds 48, instead of one, are used for reasons later explained.

The corners between the rings 32 and the sleeve 22 normally are filled with beads 58 of welding metal so that the bottom of the channel 24 is generally contoured to conform to the outer periphery of the tube 36 when deflated. Similarly, and for the reasons explained in the aforementioned Slemmons patent, the outer periphery of the slug assembly 38 is contoured to generally conform to the inner periphery of the tube 36 when the latter is deflated. The remainder of the slug assembly 38 is generally rectangular in radial section, having flat top and bottom surfaces to conform to the rings 32 and a cylindrical inner surface to engage the opposed outer surface of the caisson 14. The slug assembly 38 is made of tough, relatively-hard, abrasion-resistant rubber and its flat top and bottom surfaces may be further protected by a layer 60 of high grade rubber.

The slug segments 40 desirably are equal in size and more than two in number to facilitate installation of a slug assembly 38 in its jack channel 24. In larger size, e.g., diameters of 16 feet or more, the number of segments 40 should be increased to reduce the cost of fabrication, shipment, and handling. For example, a 6 foot diameter slug assembly 38 could be made in three or four segments and obtain the advantages of the invention, while a 16 foot diameter assembly should be made in about eight segments.

The dimensions of the segments 40 are such that, when assembled, the inner cylindrical periphery of the assembly 38 is flush with the rims 62 of its channel 24, i.e., the inner edge of the rings 32, with no gaps between the ends of adjacent segments. The presence of gaps might result in bulging of the tube 36, when inflated, into such gaps before they are closed by the constricting force of the tube with consequent pinching of the tube and increasing possibility of a blowout.

Figure 4:
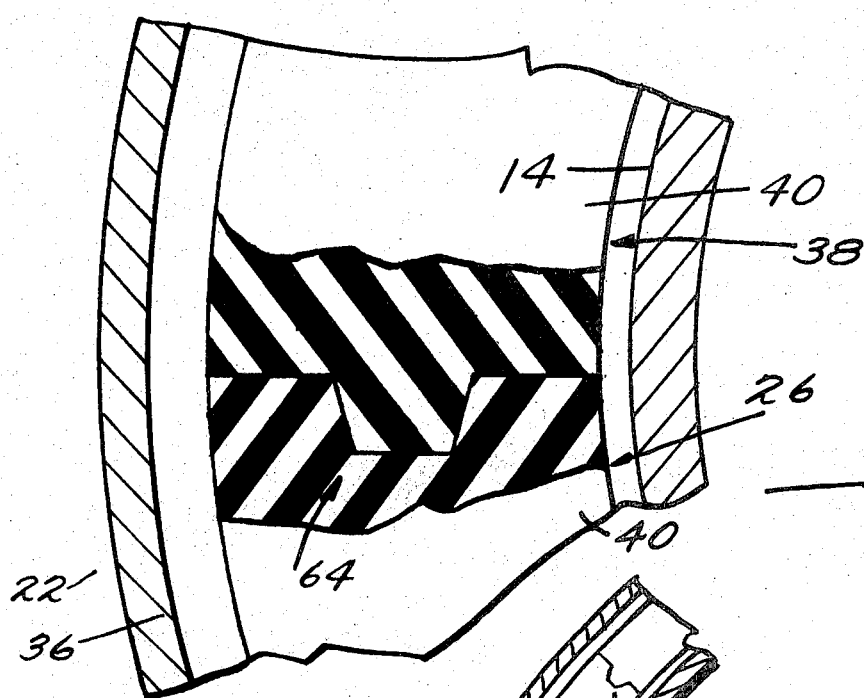
FIG. 4 is an enlarged fragmentary view, partly in section, of a portion of FIG. 3.
Figure 8:
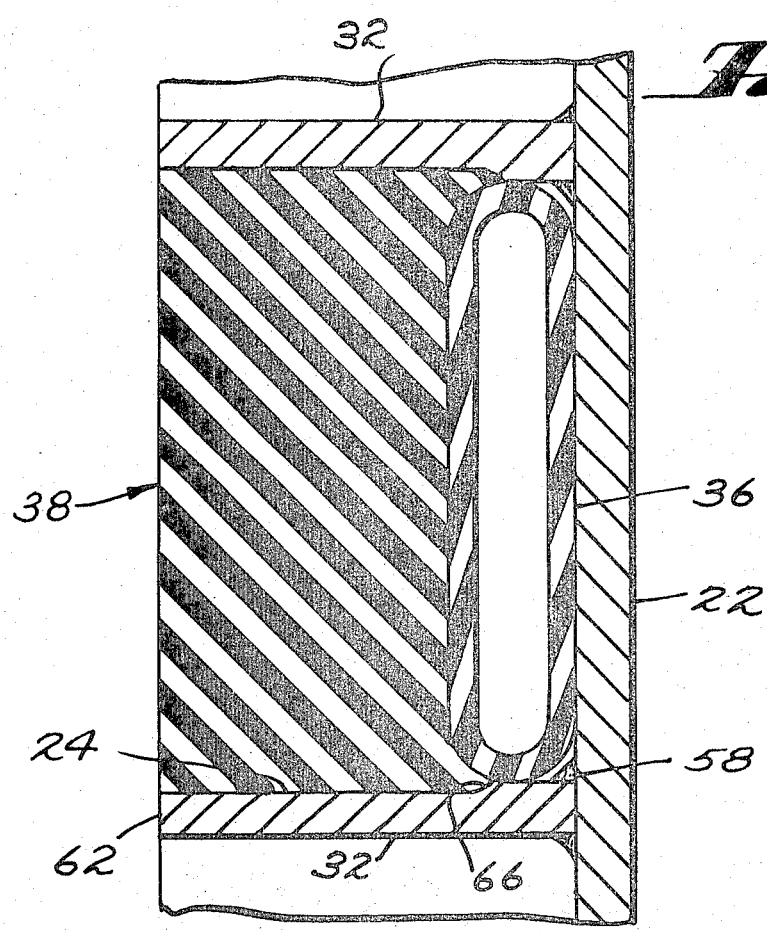
FIG. 8 is an enlarged fragmentary somewhat simplified sectional view corresponding to the right-hand portion of FIG. 2 showing another modified form of the invention.
Figure 9:
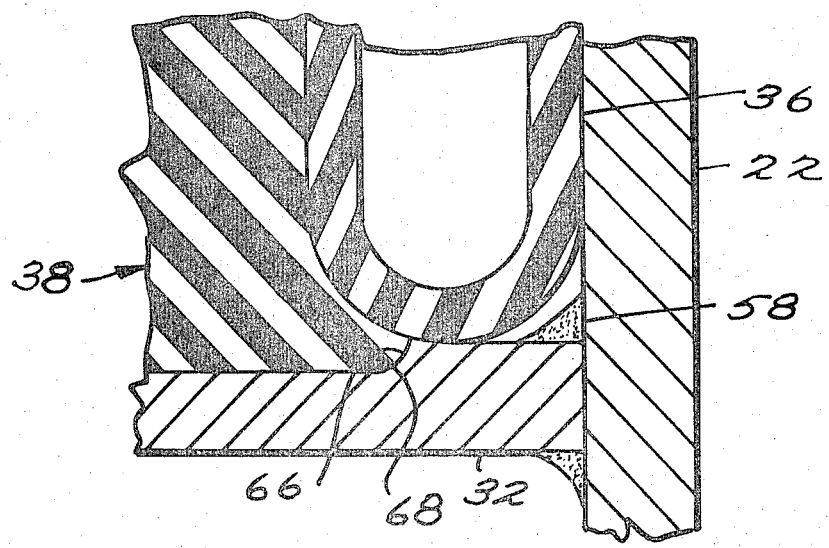
FIG. 9 is an enlarged fragmentary view of a portion of FIG. 8.

Preferably adjacent ends of the segments 40 are contoured with an interfitting vertical, i.e., extending parallel to the axis of the assembly 38, non-undercut dovetail, i.e., rib and groove arrangement 64, best shown in FIG. 4, to maintain such ends in circumferential alignment for uniform constriction of the assembly 38 on inflation of the tube 36. Such a dovetail arrangement 64 also restrains a segment 40 from being pushed or displaced too far back into its channel 24, during installation or otherwise when the tube 36 is deflated, with consequent opening of gaps between the ends of the segment and the ends of segments adjacent thereto. This same function can be accomplished positively by the modification shown in FIGS. 8 and 9. In this modification the side walls of the channel 24, i.e., the opposed surfaces of the rings 32, are provided with stops in the form of circumferential ledges 66, preferably concavely rounded in radial section, engageable by complementary portions on the circumscribing lips 68 on the slug segments 40 when the inner cylindrical surfaces thereof are flush with the channel rims 62. The ledges 66 preferably are concavely rounded to minimize any sharp edges, on the rings 32 or on the segments 40, engageable by the tube 36 and which might cut the latter when inflated. It also will be seen that this stop arrangement is applicable to a one-piece slug (not shown) to maintain the latter properly contoured, without protrusion from its channel, on installation therein.

Installation of a slug assembly 38 in its channel 24 is a relatively simple operation. All but the last two segments 40 are readily installed manually. The last two segments 40 are then initially engaged against the ends of the installed segments with their adjacent ends initially engaged outside and radially inwardly of the channel 24. A radial outward force is then exerted against these adjacent ends, as by a suitable jack (not shown), to force these ends, in a manner comparable to a toggle action and because the segments 40 have some degree of flexibility, past center and back into the channel 24. It also will be seen that a single segment 40 can be removed from the channel 24, by initially forcing it out by inflating the tube 36 and then prying it out by a suitable pry bar (not shown), with a minimum possibility of breakage. The remaining segments 40 are then readily removed.

When the tube 36 is inflated by air under high pressure, the slug assembly 38 is constricted inwardly into tight gripping engagement with the caisson 14. Because the assembly 38 is solid and the ends of the segments are in contact, the segments 40 will bulge somewhat into the gaps between the rims 62 of the channel 24 and the caisson 14. The bulging will be more pronounced in the larger gap at one side when the caisson 14 is off center. A heavy load on the jack 16 will make the bulge more pronounced at the upper or lower side of the channel 24 depending on the direction of the load. For example, when a heavy load, e.g., a large platform, is supported by the jacking mechanism 16 on the caisson 14, the bulge will be more pronounced at the upper side of the channel 24 and, in fact, may even become negative at the lower side. To put it another way, that portion of the slug assembly 38 protruding out of the channel 24 is bent upwardly by the shear force of the load, as shown in FIG. 5. When the caisson 14 is off-center this bending force urges that portion of the slug assembly 38 adjacent the wider portion of the gap to roll out of its channel 24. If this occurs a blowout of the tube 36 probably will result, and there also is the possibility of a portion of the assembly 38 jamming in the wider portion of the gap with disastrous results.

It also will be seen that the upward deflection of that portion of the slug assembly 38 protruding out of the channel 24 tends to place most of the load on the opposite portion of the assembly which is not deflected. Such uneven distribution of the load greatly enhances the possibility of slippage.

Figure 7:
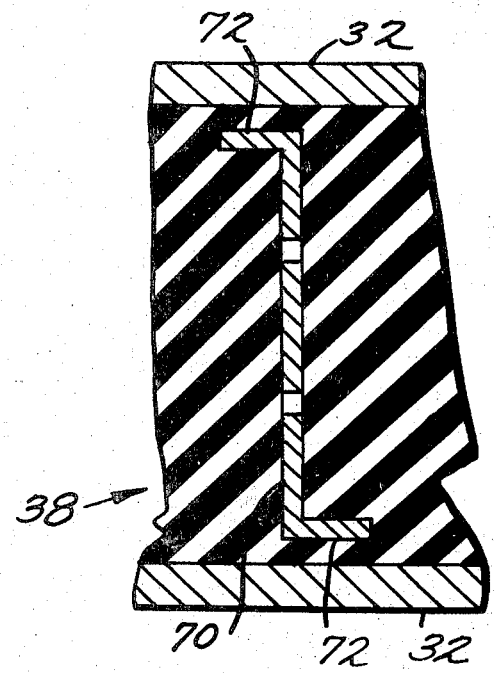
FIG. 7 is a sectional view taken generally on line 7—7 of FIG. 6.

These dangers could be eliminated, i.e., as far as rollout is concerned, by increasing the radial thickness of the slug assembly 38 and the depth of the channel 24. There is a practical limit, however, for such dimensions, not only because of economic reasons but also because increased slug radial dimensions require higher air pressure in the tube 36 to constrict the assembly 38 into gripping engagement with the caisson 14. The dangers can be substantially eliminated, however, by the simple modification shown in FIGS. 6 and 7. In this modification, a circumferential series of uniformly spaced rectangular steel plates 70, disposed in radial planes, is embedded in the slug assembly 38. The dimensions of the plates 70 are somewhat less than the corresponding dimensions of the assembly 38 in radial section. Preferably, the plates 70 are provided with flanges on their opposite sides, here shown as narrow oppositely disposed top and bottom lip-like flanges 72 (FIG. 7), to provide sufficient area, in horizontal section, to transmit the vertical loads from the rubber to the plates. Also, the plates 70 preferably are perforated for better bonding into the slug segments 40 without weakening the latter by an uninterrupted plane of cleavage.

It will be seen that the radial and vertical disposition of the plates 70 does not interfere with constriction of the slug assembly 38 by inflation of the tube 36. Moreover, compression of the rubber on both sides of each plate 70 supports the latter sufficiently to usually eliminate any need for vertical stiffening ribs, or their equivalent, on the plates.

As is best shown in FIG. 6, these plates 70 absorb some of the bending forces on the slug assembly 38, particularly at the wider portions of the gap between the rims 62 of the channel 24 and the caisson 14, and to a large extent, prevent bending and deflection of the assembly. Thus, the plates 70 inhibit rollout and bulging of the assembly 38 into the gap to thus minimize the danger of blowout and jamming.

The presence of two diametrically disposed spuds 48 for the tube 36 eliminates a danger inherent in the presence of only one which has been the practice heretofore. It will be seen that when the caisson 14 is in a maximum off-center position, which coincides with a spud 48, the slug assembly 38 may be pushed back so far as to contact and seal the opening at the inner end of the spud member 50. This occurrence would effectively block exhaust of air from the tube 36, when inflated and only one spud 48 is present, and render the jacking mechanism 16 inoperative. This danger is overcome simply by the presence of two spuds 48.

It thus will be seen that the objects of this invention have been fully and effectively accomplished. It will be realized, however, that the specific embodiment shown and described is susceptible to modification without departure from the principles of invention. Hence, the invention encompasses all modifications within the spirit and scope of the following claims.

I claim:

1. A pneumatic gripping assembly for installation in an inwardly-facing annular channel, generally rectangular in radial section, of a jacking mechanism releasably engageable with a cylindrical column-like supporting member comprising:
    an inflatable toroidal tube, of rubber or the like, of generally uniform wall thickness adapted to be disposed in the bottom of the channel and to conform generally thereto when deflated; and
    a toroidal slug assembly, of rubber or the like, comprising a plurality of solid arcuate segments of greater radial dimension than the wall of said tube, adapted to be disposed in the channel inwardly of said tube and to conform generally thereto and to said channel, said assembly having, when assembled with said segments in end-to-end abutting engagement with no gaps therebetween, a cylindrical inner surface of a diameter substantially equal to that of the rim of said channel, said assembly being adapted to be constricted into frictional gripping engagement with a cylindrical column-like supporting member by inflation of said tube.

2. A gripping assembly according to claim 1 including interfitting dovetail-like means between adjacent ends of the segments and extending parallel to the axis of the slug assembly for maintaining circumferential alignment of said segments.

3. A gripping assembly according to claim 1 including a circumferential series of metal reinforcing plates embedded in the slug assembly and disposed generally in radial planes which include the axis of said assembly.

4. A gripping assembly according to claim 1 including at least two spuds secured to and extending radially outwardly of the outer wall of the tube for admitting and exhausting air thereto and therefrom, said spuds being spaced circumferentially so that one of said spuds will remain operative in the event the inner end of the other is sealed off by an off-center relationship between the channel and the supporting member.

5. A pneumatic gripping assembly for installation in an inwardly facing annular channel, generally rectangular in radial section, of a jacking mechanism releasably engageable with a cylindrical column-like supporting member comprising:
    an inflatable toroidal tube, of rubber or the like, of generally uniform wall thickness adapted to be disposed in the bottom of the channel and to conform generally thereto when deflated; and
    a toroidal slug, of rubber or the like, adapted to be disposed in the channel inwardly of said tube and to conform generally thereto and to the channel, said slug having a cylindrical inner surface and being adapted by inflation of said tube to be constricted into frictional gripping engagement with a cylindrical column-like supporting member;
    and a circumferential series of metal reinforcing plates embedded in said slug and disposed in radial planes which include the axis of said assembly.

6. A gripping assembly according to claim 5 in which the plates are perforated for bonding to the material of the slug.

7. A gripping assembly according to claim 6 in which the plates are provided with flanges on their opposite sides disposed in planes generally normal to the axis of said assembly.

8. A pneumatic gripping assembly for installation in an inwardly facing annular channel, generally rectangular in radial section, of a jacking mechanism releasably engageable with a cylindrical column-like supporting member comprising:
    an inflatable toroidal gripping means, of rubber or the like, adapted to be disposed in the channel and to conform generally thereto, with the inner surface of said means being substantially flush with the rims of said channel when deflated; and
    at least two spuds secured to and extending radially outwardly of the outer wall of said gripping means for admitting, and exhausting air thereto and therefrom, the inner ends of said spuds being contacted by the inner wall of said gripping means when the latter is deflated and said spuds being spaced circumferentially so that one of said spuds will remain operative in the event the inner end of the other is sealed off by the inner wall of said gripping means occasioned by an off-center relationship between the channel and the supporting member.

9. In a jacking mechanism releasably engageable with a cylindrical column-like supporting member and having an inwardly-facing annular channel, the combination of an inflatable toroidal tube, of rubber or the like, of generally uniform wall thickness disposed in the bottom of said channel and conforming generally thereto;

a toroidal slug means of rubber or the like, of greater radial dimension than the wall of said tube, disposed in said channel inwardly of said tube and conforming generally thereto and to said channel, said means having a cylindrical inner surface of a diameter substantially equal to that of the rims of said channel, said slug means being constrictable into frictional gripping engagement with a cylindrical column-like supporting member by inflation of said tube; and inter-engageable stop means on said slug means and said channel for preventing movement of said means into said channel beyond the point where said cylindrical inner surface of said assembly is substantially flush with said channel rims.

10. The structure defined in claim 9 wherein the slug means comprises a plurality of arcuate segments, and said slug means has the cylindrical inner surface when said segments are assembled in end-to-end abutting relation with no gaps therebetween.

* * * * *